Inventors
Frederick E. Munroe
Albert N. J. Uren

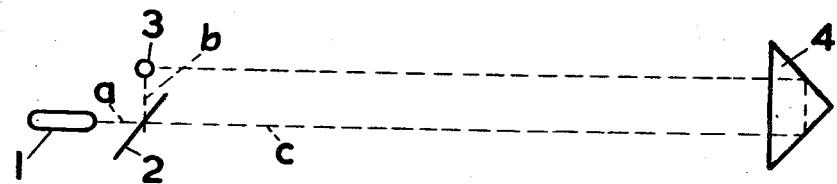
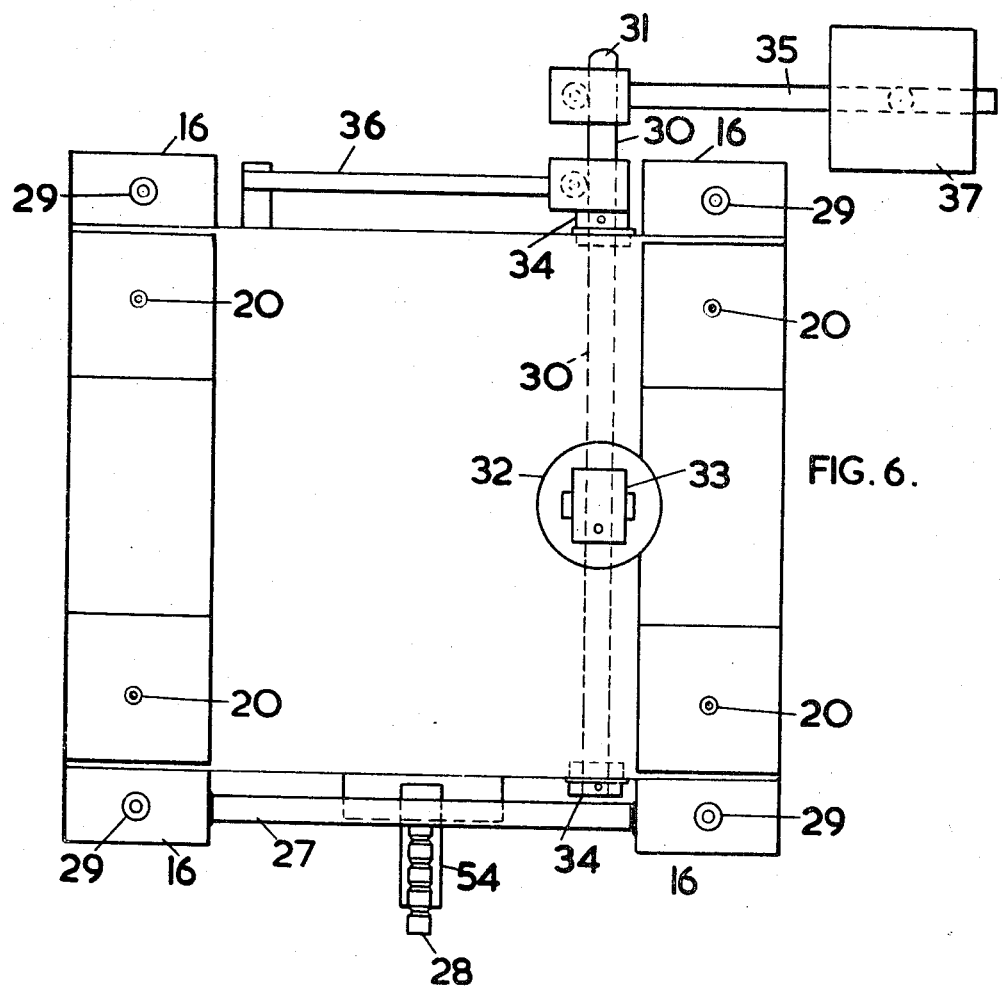

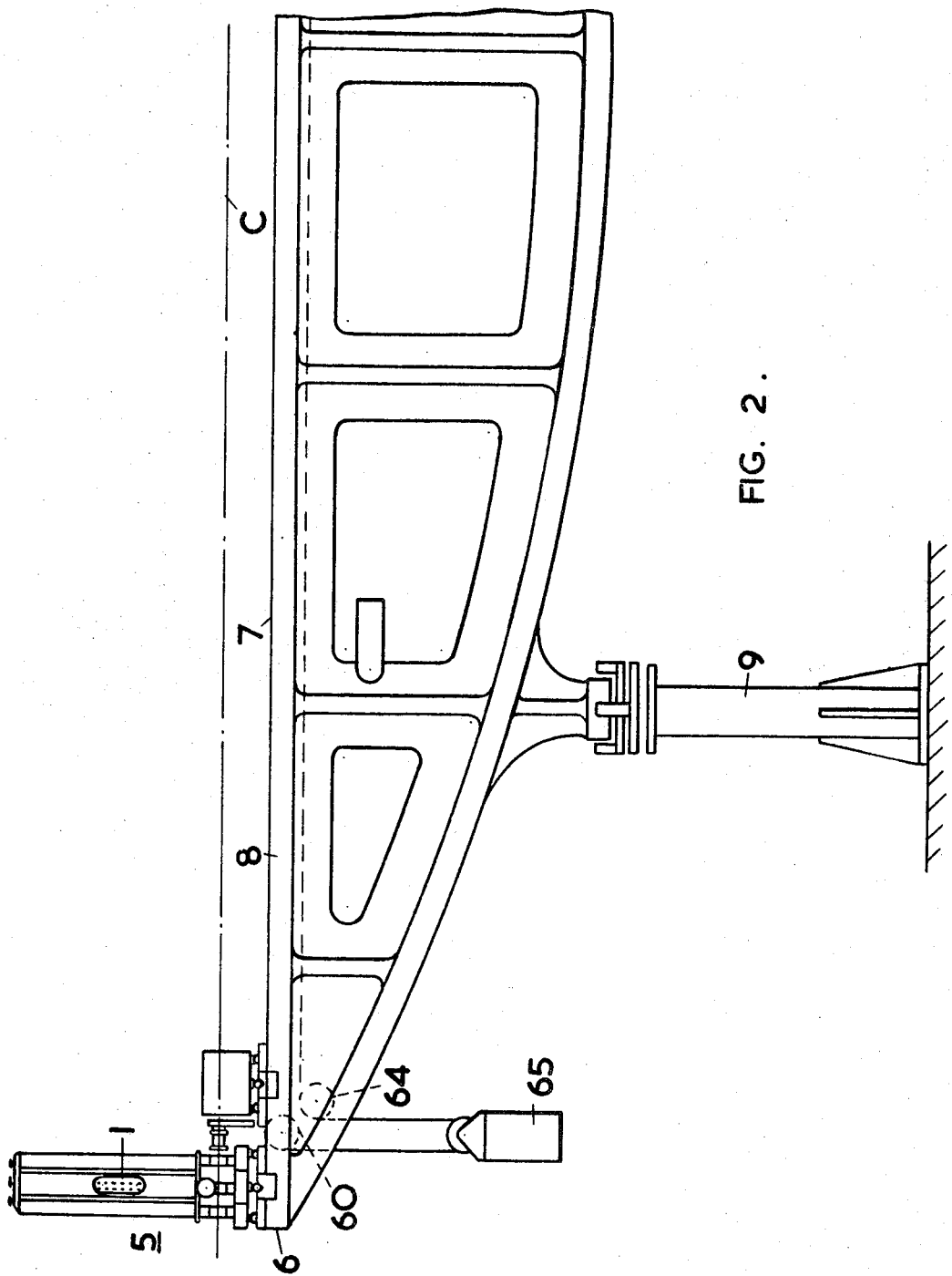

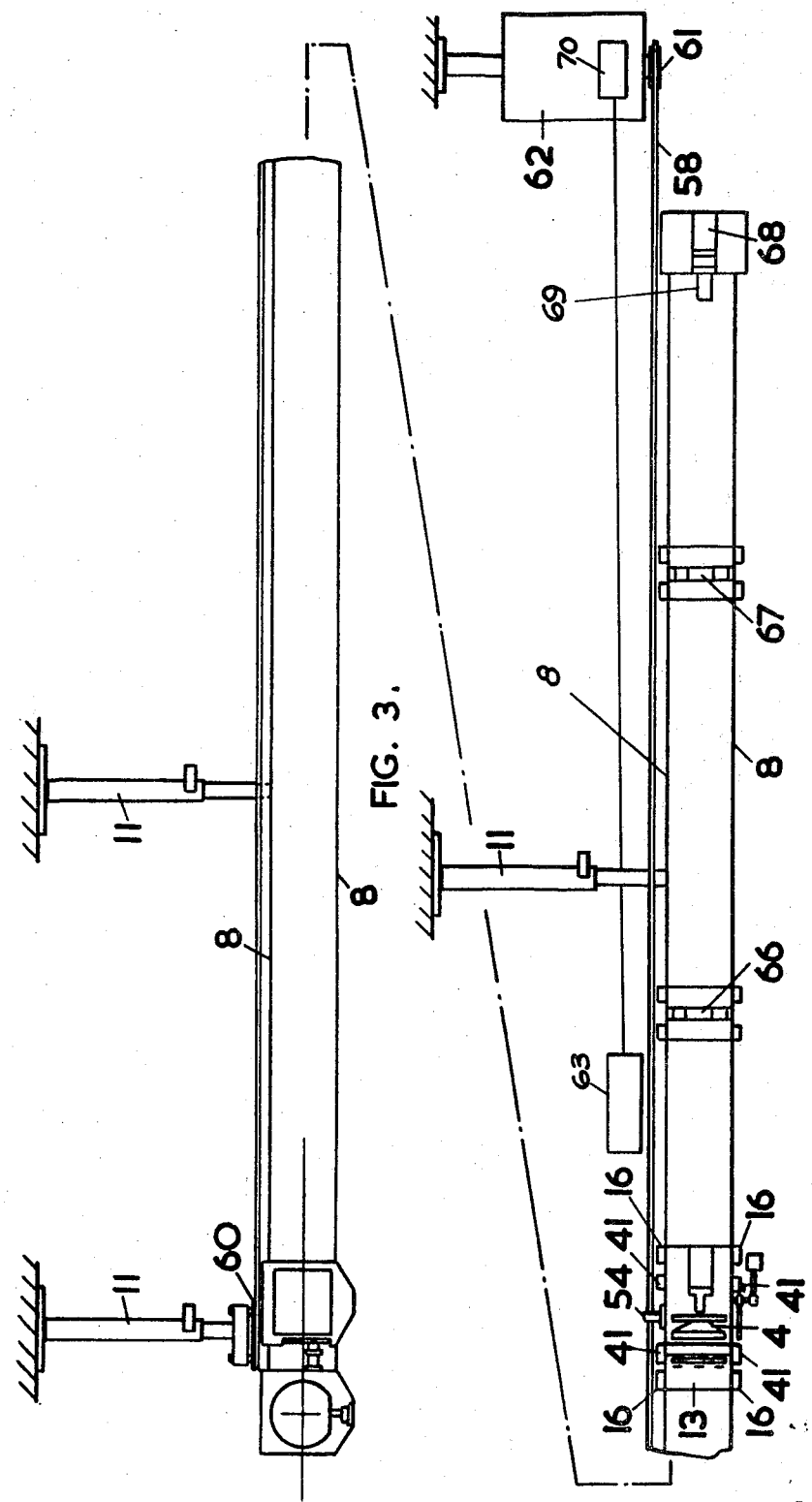

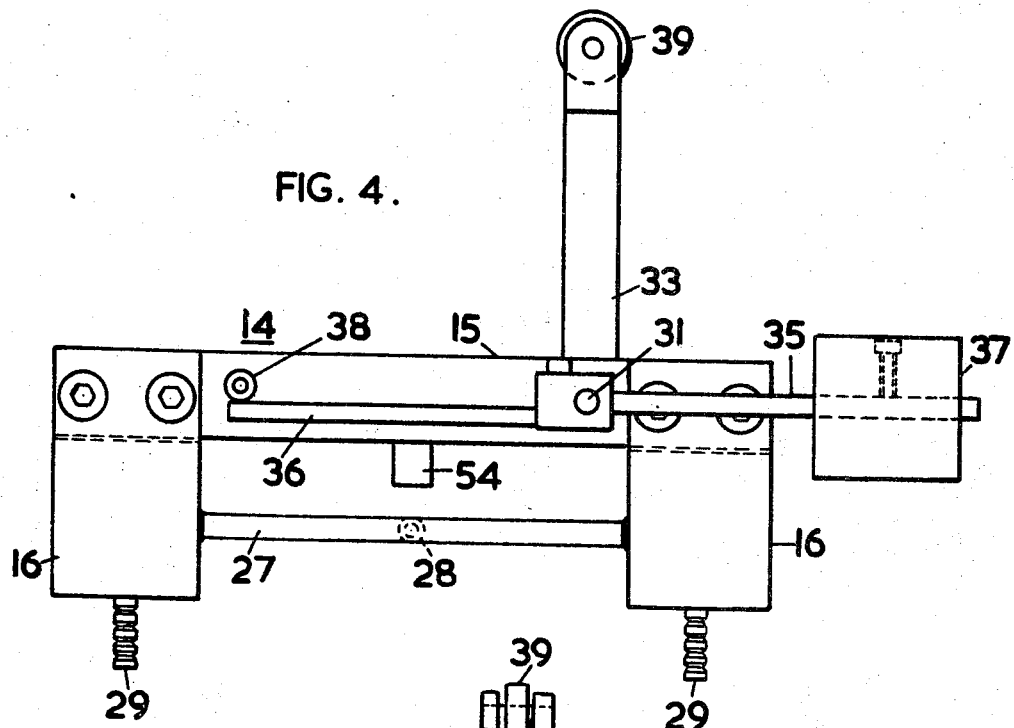

United States Patent Office 3,540,129
Patented Nov. 17, 1970

3,540,129
MEASURING INSTRUMENTS
Frederick Edwards Munroe, Chesterfield, and Albert Norman John Uren, Bromley, England, assignors to National Research Development Corporation, London, England
Filed Jan. 8, 1968, Ser. No. 696,395
Claims priority, application Great Britain, Jan. 9, 1967, 1,066/67
Int. Cl. G01b 5/00
U.S. Cl. 33—143                            9 Claims

ABSTRACT OF THE DISCLOSURE

A measuring instrument has the stylus for contacting the article to be measured and mounted on a carriage so as to be capable of a limited amount of movement relatively to the carriage. The stylus is provided with substantially constant loading so that, after it has contacted the article, continued movement of the carriage, within the said predetermined limit of relative movement, will not materially alter the pressure of this contact. The instrument has nozzles through which, during the measuring operation, compressed air is passed to provide air bearings for the carriage.

---

The present invention relates to improvements in or connected with measuring instruments.

Certain measuring instruments include a stylus and means which, during a measuring operation, conveys the stylus along a fixed path to bring it into contact, with a predetermined pressure, with the article to be measured. In cases where measurements are made in very minute units, for example in micro inches, deviation from a specific stylus pressure upon the article can cause a considerable difference in a reading.

According to the present invention, in a measuring instrument of the kind just described there is provided a carriage for the stylus, compressed air operable means whereby this carriage is floated on air bearings while the instrument is in operation, and driving means for propelling the carriage during this operation to bring the stylus and article to be measured into contact. The driving means is operatively connected to the stylus by lost motion means which permits the said driving means to continue to move within a predetermined maximum distance after the contact between the stylus and article has been made, and loading means is provided for applying a bias to the stylus to maintain a substantially constant pressure between this and the article both while the said lost-motion is taking place and after this has ceased.

The means by which the said bias is effected may comprise a weight operating for example through a lever.

The stylus carriage may be hand operated, in which latter case it may be connected to an endless belt arranged to be driven by an electric motor, the arrangement being such that the belt will slip on the pulley driven by the motor should the aforesaid lost-motion be entirely taken up. Preferably, the arrangement is such that the motor may be driven at two speeds, at one of which the stylus can be driven into close proximity to the article, and then driven at a very slow speed into contact with it and partly taking up the lost motion. It is thus made possible always to ensure that the predetermined pressure between the article and stylus will be obtained without any manipulation or adjustment being required.

If desired, a suitable scale and fiducial arrangement may be provided to indicate the extent of the lost motion that has been taken up when the driving means comes to rest.

The invention will now be described, by way of example, with reference to the accompanying drawings, of which:

FIG. 1 is a diagrammatic view showing a known type of interferometer arrangement to which the invention is applicable.

FIG. 3 is a plan of the instrument shown in FIG. 2.

FIG. 4 is a side elevation of part of the stylus conveying means.

FIG. 5 is an end view of the part shown in FIG. 4.

FIG. 6 is a plan of the underside of the same part.

Figure 2:
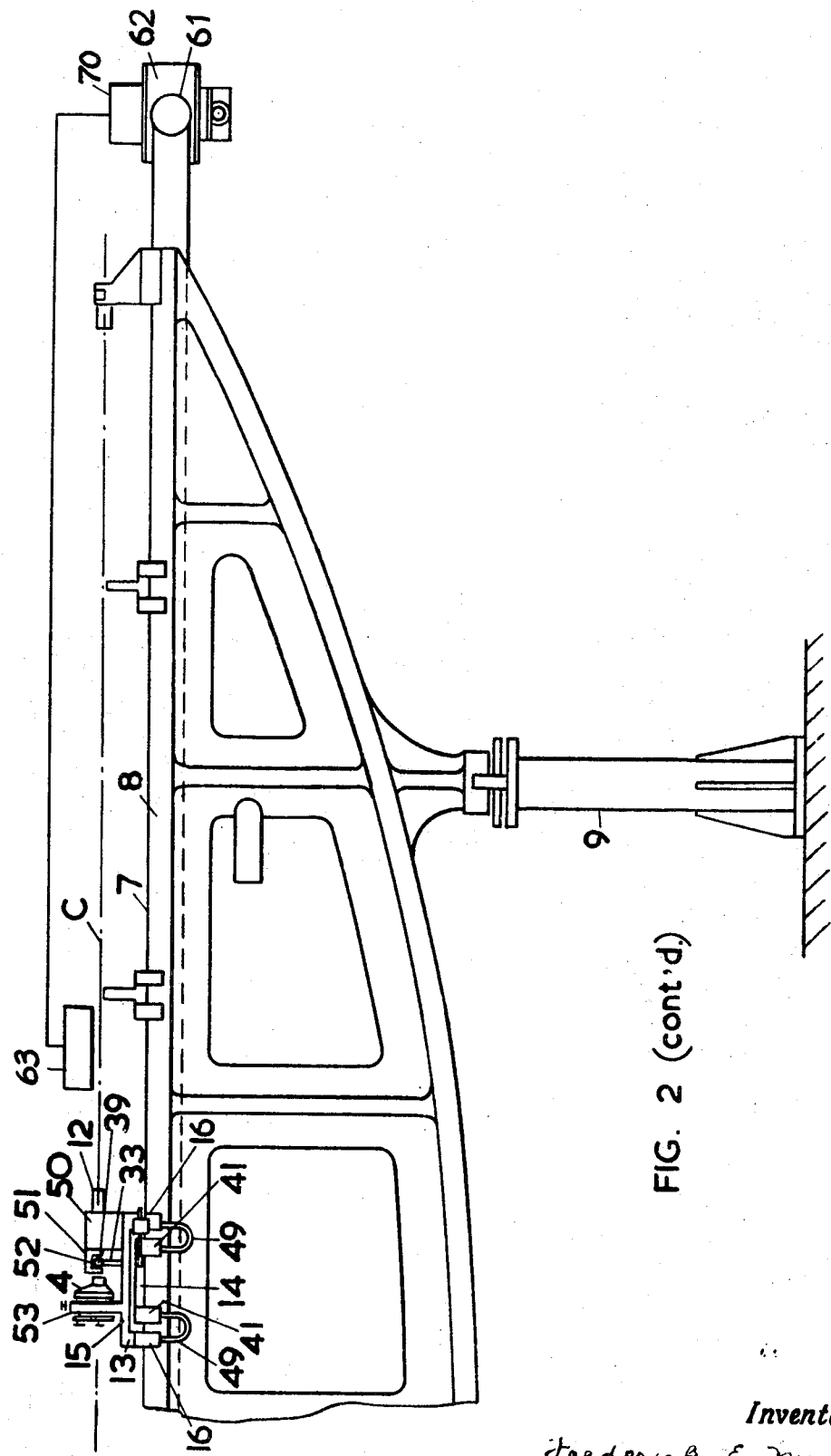
FIG. 2 is a side elevation of a measuring instrument according to the invention.

The interferometer arrangement shown diagrammatically in FIG. 1 is of the kind comprising a laser 1 and a beam splitting mirror 2, which splits the laser beam $a$ into two parts, $b$ and $c$, the part $b$ pressing directly to a photo-electric cell 3, and the part $c$ to a prism 4 fixed relatively to the stylus, the part $c$ being reflected back by this prism, along a parallel return path, to the cell 3. In the actual instrument about to be described the laser 1 and its associated parts, including a mirror (not shown) inclined to the axis of the laser so as to direct the beam from this forwardly along the instrument, are carried by a structure, indicated generally by 5 (FIG. 2), which structure is in turn mounted upon one end of a bed 6 so that the beam component $c$ will be projected parallel to and above the precision finished top 7 of this bed, to the prism 4.

The bed 6 is provided with precision finished side faces 8, is of substantial construction, so as to minimise flexure due to vibration, and is carried upon pillars 9, 9, supported at their lower ends upon a solid base or flooring 10. Lateral stays 11 (FIG. 3) are connected between one side of the bed and a concrete wall or other rigid structure.

The prism 4 and a stylus 12 are mounted upon a carriage 13 disposed over a carriage 14.

Figure 7:
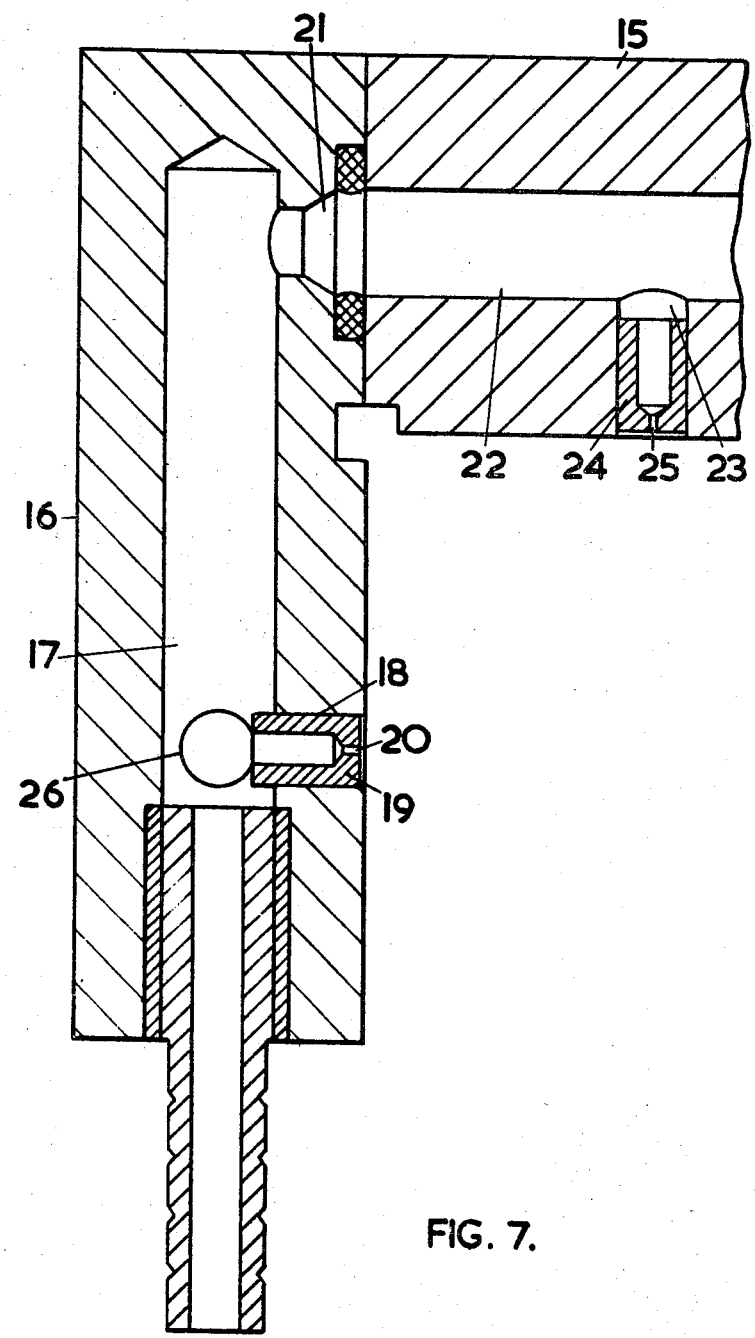
FIGS. 7 and 8 are fragmentary sectional views of certain details.
Figure 8:
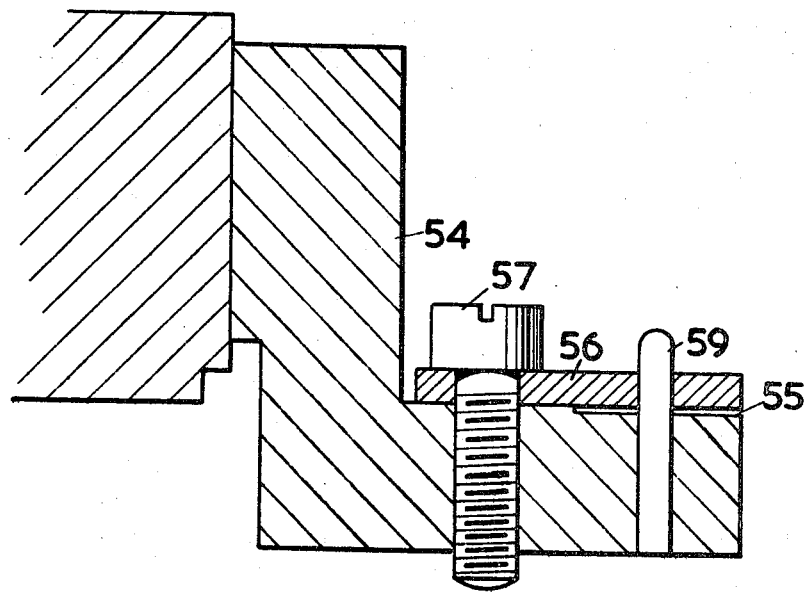
Figure 11:
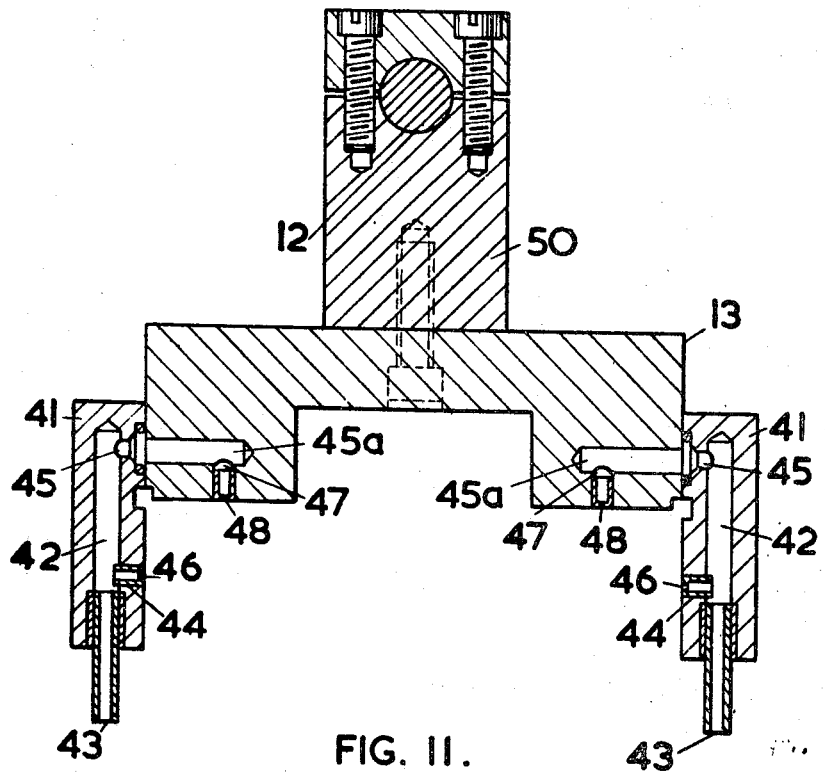
FIG. 11 is a sectional elevation on line XI—XI, FIG. 9.

The carriage 14, which will first be described, comprises a horizontal top portion 15 which is of rectangular outline and has fixed to the end portion of each of its side edges a rectangular body 16 which extends downwardly in spaced parallel relationship to the adjacent side edge of the table. Each of these rectangular bodies 16 is drilled centrally from its lower end to near its top end, to form a vertical passage 17 (FIG. 7), and is drilled through its inner face adjacent to the side edge of the table to form a passage 18 which communicates with the vertical passage. In this further passage is contained a bush 19 the opening at the outer end of which is restricted to form an air nozzle 20 for directing an air jet against the adjacent edge of the table or bed, as will be later explained, and which nozzles will hereinafter be referred to as "lateral nozzles."

Through the centre of that part of the inner surface of each of the said rectangular bodies abutting the edge of the carriage is drilled a horizontal passage 21 the inner end of which communicates with the said vertical passage and the other end of which horizontal passage communicates with one end of a horizontal passage 22 that passes transversely through the top portion of the carriage to the corresponding position in the opposite side edge of this portion.

Drilled upwardly from the under face of the top portion of the carriage at a point near each corner of this is a vertical passage 23 the upper end of which communicates with the adjacent transverse passage, which vertical passage contains a bush 24 the outer end of the bore of which is restricted to form a nozzle 25 for directing an air jet onto the top of the table, as will hereinafter be explained, each of these four nozzles being referred to in the ensuing description as a "vertical nozzle."

In each of the two aforesaid rectangular bodies at one side of the carriage is provided a passage 26 extending inwardly from the side edge of the body directed to the other rectangular body, this lateral passage at its inner end communicating with the vertical passage 17 in the respective body 16. Connected between these two passages is a pipe 27 which is parallel to the nearby edge of the carriage top, and this pipe is provided, midway of its length, with a nipple 28 which can be connected to a rubber or other suitable flexible tube, through which compressed air would be supplied. Provided within the lower end of the vertical passage 17 within each of the aforesaid rectangular bodies is a similar nipple 29 the purpose of which will be hereinafter described.

Between and parallel to the aforesaid transverse passages 22 in the top of the carriage is drilled a hole 30 which is located near the forward transverse passage and extends from one side edge to the other of this top so as to form a bearing for a shaft 31 which extends completely through the hole and outwardly beyond each side edge of the carriage 14. Midway of the length of this bearing 30 there is provided a circular aperture 32 in the top of the carriage, the central axis of which aperture intersects the axis of the bearing. The size of the aperture is such as to permit the lower end of a unstanding arm 33 to be fixed upon the shaft 31 so that the arm will rock back and forth with the shaft. The shaft 31 is retained against withdrawal from the bearing 30 by having fixed upon it at each side edge of the carriage top a collar 34, but the end portion of the shaft at the edge of the table remote from that below which is located the said pipe 27 extends outwardly beyond the retaining collar 34 and has fixed to it one end of each of two arms, 35, 36. The arm 35 extends in a forward direction and the arm 36 in a rearward direction, the forwardly extending arm 35 carrying a weight 37 the position of which may be adjusted along this arm. The purpose of the weighted arm 35 is to bias the upstanding arm 33 normally into a forward position until the rearwardly extending arm 36 comes up against a stop pin 38 (FIGS. 4 and 6), carried in the adjacent side edge of the table. The upper end of the vertically disposed arm 33 is provided with a roller 39 the axis of rotation of which is parallel to the shaft 31. The purpose of this roller will be explained later.

Figure 9:
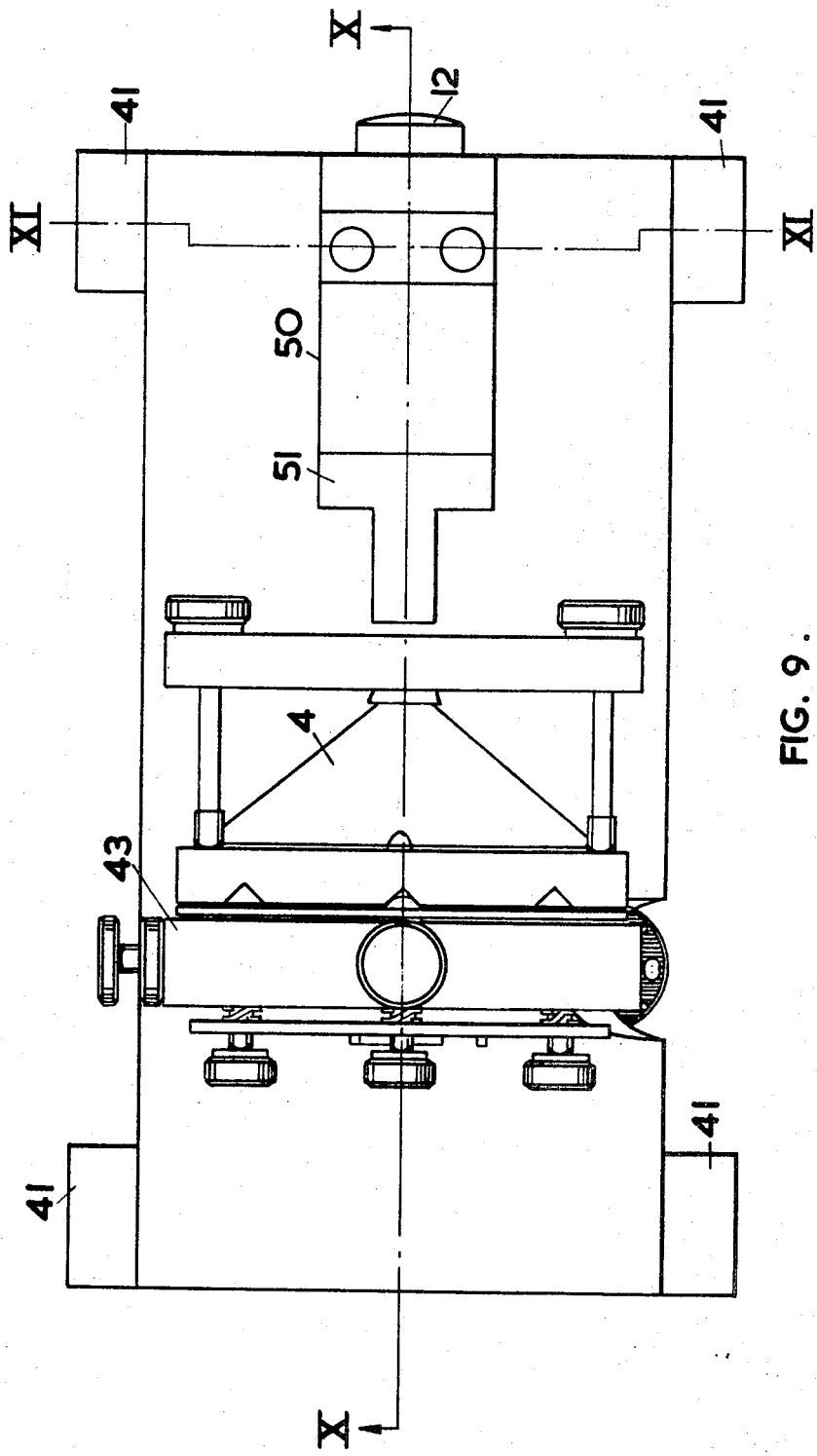
FIG. 9 is a plan of a further part of the stylus conveying means.
Figure 10:
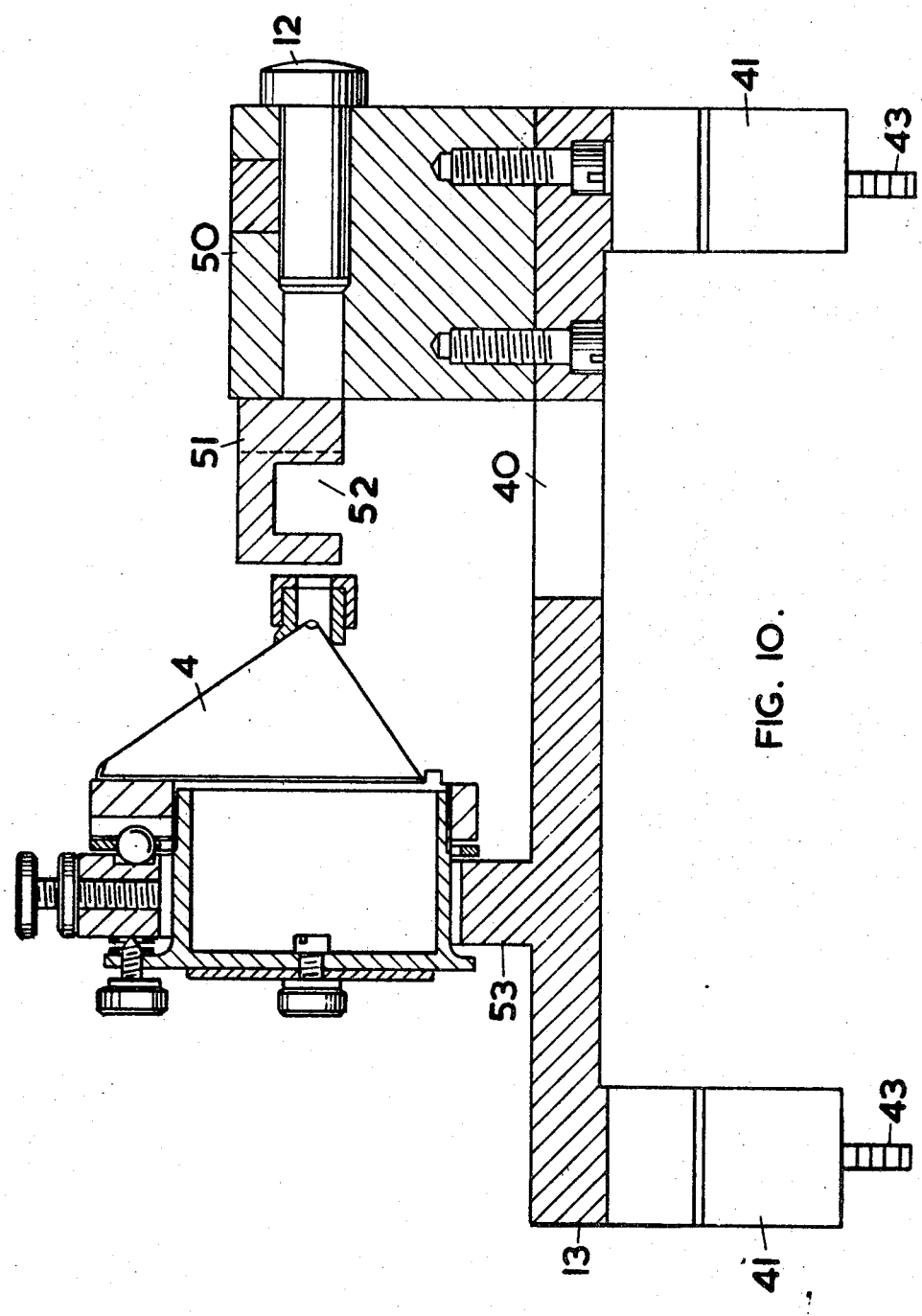
FIG. 10 is a sectional elevation on line X—X, FIG. 9.

The carriage 13 is disposed above the carriage 14 and is slotted at 40 (FIGS. 9 and 10) to permit the free passage of the aforesaid upstanding arm 33. The carriage 13 is of greater length than the carriage 14 and is provided at the ends of its respective side edges with downwardly extending rectangular bodies 41 similar to the bodies 16 of the carriage 14. The arrangement is such that the two downwardly extending rectangular bodies 41 at the front end of the carriage 13 are located forwardly of those of the carriage 14 and the two downwardly extending rectangular bodies 41 at the rear end of the carriage 13 are situated rearwardly of those of the carriage 14. Each of the downwardly extending rectangular bodies 41 of the carriage 13 is provided with a vertical passage 42 carrying at its lower end a nipple 43 and is provided with horizontal passages 44, 45, communicating at their inner ends with the vertical passage 42. The horizontal passage 44 carries a side nozzle 46 for the purpose of directing a jet of air onto the adjacent side edge of the table and the horizontal passage 45 communicates with a horizontal passage 45a in the top of the carriage 13 which in turn communicates with a vertical passage 47 in the underside of this top, this last-mentioned vertical passage containing a vertical nozzle 48 arranged to direct a jet of air downwardly onto the top of the bed 6.

The nipples 29 at the lower ends of the vertical passages 17 in the downwardly extending rectangular bodies 16 of the carriage 14 are connected by downwardly looped lengths of rubber or other suitable flexible tubes 49 to the corresponding nipples 43 of the carriage 13. It is therefore necessary for the pressure of the compressed air supplied to the nipple 28 carried by the pipe 27 extending between the pair of downwardly extending rectangular bodies 16 at one side of the carriage 14 to be sufficiently high for both the carriage 13 and carriage 14 to be supported by the jets of air proceeding from the vertical nozzles 25 and 48 impinging upon the bed 6, while the jets proceeding from the lateral nozzles 20 and 46 maintain the respective associated sets of downwardly extending rectangular bodies 15 and 41 out of contact with the edges of the bed 6. The amount of relative movement between the carriages 13 and 14 is limited by virtue of the fact that the said downwardly extending rectangular bodies of the two carriages at each side of the bed are arranged to be substantially in line longitudinally of the table.

The forward end portion of the carriage 13 has fixed upon its upper surface a bracket 50 carrying the stylus 12 the forward end face of which is appropriately radiused (FIGS. 9 and 10) to ensure measurement on the central axis. Fixed to the rear of this bracket 50 is a member 51 which is provided with a channel 52 across its underside to receive the roller 39 carried at the upper end of the aforesaid vertical arm 33. There is also provided, upon the rear part of the carriage 13, a bracket 53 for carrying the prism 4.

In the arrangement just described, the weight 37, on the forwardly projecting arm 35, which acts through this arm and the upstanding arm 33 causes the carriage 13 normally to be in a position where the said downwardly extending bodies 41 at its rear are in contact with the corresponding bodies 16 of the carriage 14. Thus, when the stylus has contacted the article (not shown), the carriage 13 will stop its forward movement, but the carriage 14 can continue to move until its forward pair of downwardly extending bodies 16, 16, contacts the corresponding pair 41, 41, of the carriage 13.

By arranging that the weight-carrying arm 35 shall normally be slightly below the horizontal and shall be caused to raise the same distance above the horizontal before the carriage 14 has reached the extent of its permitted continued movement, a substantially constant pressure will be maintained between the stylus 12 and article.

The carriage 14 is at one side provided with a bracket 54 (FIGS. 3, 4, 5 and 8) which has a stepped portion 55, and a clamping plate 56 operated by a screw 57 to clamp the upper run of a horizontal belt 58 (FIGS. 2 and 3) within the stepped portion, which latter is provided with a pin 59 which passes through a hole in the clamping plate. This belt 58 is carried by pulleys, 60, 61, the pulley 61 being arranged to be driven by an electric motor 62 when it is desired to convey the stylus 12 quickly to a point a short distance from the article as determined by proximity detecting means 63 well known in the art, when the motor can be caused to operate at a much slower speed, and stopped after the stylus has contacted the article preferably within the limits of the arrangement and as determined by conventional speed reduction means 70 also well known in the art. The lower run of the belt 58 is looped out between the pulley 60 and a pulley 64 carrying a weight 65, the arrangement being such as to permit slip between the belt 58 and motor driven pulley 61 in the event of the carriage 14 over-running the lost-motion between itself and the carriage 13.

If desired, the arm 36 and stop pin 38 may be omitted and an adjustable buffer (not shown) may be provided which is centrally positioned between the first and second carriages.

Provided upon the bed 6 are movable V-blocks 6, 67, for receiving a rod or billet (not shown), and carried by a bracket 68, fixed to the bed, is an anvil 69 against which the end of the rod or billet remote from that which would be contacted by the stylus would be placed.

We claim:

1. In a measuring instrument, a contact pressure controlling device comprising:
   a stylus for contacting the article to be measured,
   a stylus carriage,
   compressed-air-operable means whereby this carriage is floated on air bearings while the instrument is in operation,
   driving means for propelling the carriage during this operation to bring the stylus and article to be measured into contact,
   lost-motion means operatively connecting the driving means to the stylus to permit the driving means to continue to move within a predetermined maximum distance after this contact has been made, and
   loading means including a weight operating adjustably through a pivoted lever arm for applying a bias to stylus to maintain a substantially constant pressure between the stylus and the article both while the said lost motion is taking place and after this motion has ceased.

2. A measuring instrument as claimed in claim 1, comprising detecting means to detect when the stylus is in close proximity to the article to enable the drive to the stylus to be stopped within the said predetermined maximum distance after contact between the stylus and article has been made.

3. A measuring instrument as claimed in claim 2, comprising means for reducing the speed at which the stylus carriage is driven after the said detecting means has come into operation and until the said drive has been stopped.

4. In a measuring instrument, a contact pressure controlling device comprising:
   a stylus for contacting the article to be measured,
   a stylus carriage,
   a second carriage,
   compressed-air-operable means for floating the stylus carriage over the second carriage by air bearings, while the instrument is in operation,
   driving means for propelling the second carriage during this operation to bring the stylus and article to be measured into contact,
   lost-motion means connecting the first carriage to the second carriage, which lost-motion means enables the second carriage to move within a predetermined maximum distance after this contact has been made, and
   loading means including a weight operating adjustably through a pivoted lever arm for applying a bias to the stylus carriage to maintain a substantially constant pressure between the stylus and the article both while the said lost-motion is taking place and after this motion has ceased.

5. A measuring instrument as claimed in claim 4, comprising detecting means to detect when the stylus is in close proximity to the article to enable the drive to the stylus to be stopped within the said predetermined maximum distance after contact between the stylus and article has been made.

6. A measuring instrument as claimed in claim 5, comprising means for reducing the speed at which the stylus carriage is driven after the said detecting means has come into operation and until the said drive has been stopped.

7. A measuring instrument as claimed in claim 4, comprising compressed-air-operable means for floating the second carriage on air bearings while the instrument is in operation.

8. A measuring instrument as claimed in claim 7, comprising detecting means to detect when the stylus is in close proximity to the article to enable the drive to the stylus to be stopped within the said predetermined maximum distance after contact between the stylus and article has been made.

9. A measuring instrument as claimed in claim 4, comprising compressed-air-operable means for floating the second carriage on air bearings while the instrument is in operation, detecting means to detect when the stylus is in close proximity to the article to enable the drive to the stylus to be stopped within the said maximum distance after contact between the stylus and article has been made, and means for reducing the speed at which the stylus carriage is driven after the said detecting means has come into operation and until the said drive has been stopped.

References Cited

UNITED STATES PATENTS

| 2,604,004 | 7/1952 | Root. |
| 2,968,100 | 1/1961 | Etchell. |
| 3,158,942 | 12/1964 | Kirchner et al. |
| 3,231,319 | 1/1966 | Porath. |

HARRY N. HAROIAN, Primary Examiner